Feb. 21, 1967 R. M. ANDERSON 3,304,750
PHOTOFLASH LAMP
Filed June 29, 1965

Inventor:
Robert M. Anderson
by Richard H. Burgess
His Attorney

United States Patent Office 3,304,750
Patented Feb. 21, 1967

3,304,750
PHOTOFLASH LAMP
Robert M. Anderson, Euclid, Ohio, assignor to General
Electric Company, a corporation of New York
Filed June 29, 1965, Ser. No. 467,831
4 Claims. (Cl. 67—31)

This invention relates to photoflash lamps comprising a sealed envelope containing a combustible light-emitting material, and more particularly to tubular photoflash lamps wherein the envelope is sealed at one end by means of an exhaust tip. Still more particularly, it relates to tubular photoflash lamps sealed at one end by tipping and having increased effective volume within the same overall external dimensions as compared to previously known comparable commercial photoflash lamps.

Improvemetns in miniaturization, accompanied with increased and better controlled light output has long been a goal in the photoflash lamp art. The photoflash industry is presently utilizing an all-glass miniature photoflash lamp known as the AG-1 as a lamp of desirable minimum size with useful light output intensity and light characteristics. Standardized overall external dimensions of the AG-1 lamp have been set by the American Standards Association, and much photographic equipment has been designed in reliance on these standards. However, increased light output from a lamp having the same overall dimensions as an AG-1 is greatly to be desired.

Furthermore, achievements in increased light output relative to overall lamp size could be useful in other manners. For instance, a photoflash lamp with the same light output characteristics and intensity as the AG-1 but having considerably smaller overall size would be helpful to the designer of future photoflash equipment as another real step in miniaturization.

Accordingly, it is a principal object of the invention to provide tubular photoflash lamps having substantially higher light output per unit of overall external volume than are presently available.

Another object of the invention is to provide photoflash lamps having a higher ratio of effective internal volume to overall external size than presently available in comparable lamps.

Still another object is to provide such photoflash lamps in which the increase in relative internal volume in relation to overall external size is achieved without making the walls or plastic coating thinner, and, indeed, allowing for thicker glass walls and heavier plastic coatings to accommodate higher filling and firing pressures and greater heat generation within the lamp as more light is produced.

A further object of the invention is to provide a tubular photoflash lamp closed at one end by an exhaust tip in which the exhaust tip is, to a substantial extent, recessed into a well-shaped portion on an end of the lamp, thereby somewhat protecting the exhaust tip from mechanical breakage.

Further objects and advantages of the invention will become apparent from the description and accompanying drawing.

Briefly stated, the present invention in one form provides a tubular photoflash lamp comprising a hermetically sealed envelope containing ignition means, combustible material, and a combustion-supporting atmosphere, and being closed at one end such as by a stem press base and at the other end by an exhaust tip, the wall at said other end being re-entrant into the tubular envelope to provide a retroverted well, with the exhaust tip arising outwardly from said well.

Known AG-1 photoflash lamps are described and claimed in Patent 2,982,119—Anderson, and methods for making such AG-1 photoflash lamps are described and claimed in Patent 3,188,162—Anderson et al., both assigned to the assignee of the present application. A method for making photoflash lamps of the present invention is described in detail and claimed in applicant's copending application Serial No. 467,886 filed of even date with the present application.

Figure 1:
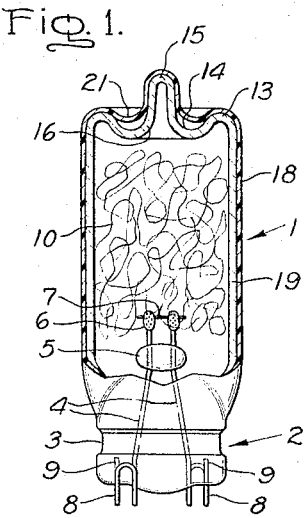
FIG. 1 is a front elevational view, partly in section, of a photoflash lamp according to the present invention.
Figure 2:
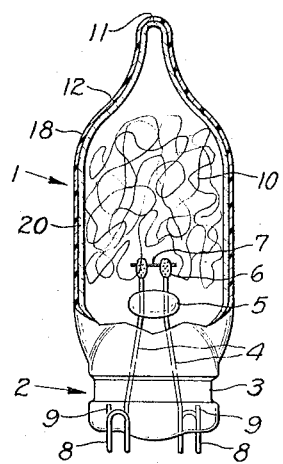
FIG. 2 is a front elevational view, partly in section, of an AG-1 photoflash lamp of the prior art.

Referring now to the drawing, a flash lamp made according to the present invention is shown partly in section in FIG. 1 and can be compared side by side with an AG-1 prior art lamp in FIG. 2. In one embodiment of the present invention, the entire structure of the lamp other than the tipped end may be identical with that of AG-1 photoflash lamps. Since the structure of AG-1 lamps is known in the art as described and claimed in above-mentioned Patent 2,982,119 and other patents referenced therein, such structure of lamps of the present invention as may be common therewith will not be described here in as much detail as otherwise.

These lamps include a generally cylindrical tubular bulb portion 1 which is terminated and closed at one end by a stem press base 2. The base 2 has therein a slot 3 which permits ready handling and use of the flash lamps. Lead wires 4 are sealed through the base 2 and may be held in stable relative position inside the lamp by a glass bead 5. The inner ends of the lead wires are coated with primer ignition material 6 which is also in contact with the ignition filament 7. This filament 7 may desirably be an alloy of tungsten and rhenium such as described and claimed in Patent 3,123,993—Cressman et al., assigned to the assignee of the present invention. The outer end of the lead wires 4 may be bent to form electrical contacts 8, with their extreme ends 9 being retroverted and embedded in the base 2. The bulb 1 is filled with combustion-supporting gases which may be at pressures above atmospheric, and preferably above about five atmospheres. The bulb 1 also contains filamentary combustible material 10 such as shredded zirconium foil. Other forms of combustible material may be used.

The prior art AG-1 lamp shown in FIG. 2 terminates at the end opposite the base 2 in an exhaust tip 11 formed by melting a necked-down portion of the attenuation produced in making the lamp. The connection of the tip 11 with the tubular bulb portion is a relatively smooth radius 12. In contrast, lamps of the present invention are so made as to eliminate or avoid the radius portion 12 of prior art lamp envelopes, and, moreover, the tubular portion continues relatively uniformly to a shoulder where it is sharply bent back on itself in a re-entrant manner to form a rim 13 about a retroverted well 14 which is essentially symmetrical about the axis of the tubular bulb. The exhaust tip 15, which may be approximately the same size and shape as the exhaust tip 11 on the prior art lamp, arises from the bottom of this well 14, and, thereby, at least a substantial portion 16 of the exhaust tip 15 is depressed below the rim 13 and somewhat protected by the rim 13 from mechanical breakage. Plastic coatings 18 are used to contain the lamp and avoid shattering on flashing.

Figure 3:
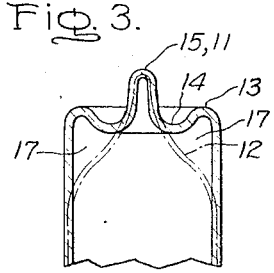
FIG. 3 is a schematic representation, in section, of the tipped end of a photoflash lamp of the invention superimposed on the tipped end of a prior art AG-1 photoflash lamp to illustrate the difference in internal volume within the same overall length and diameter.

As shown in FIG. 3, this structure also provides a considerable incremental volume illustrated at 17 in the flash lamps of the invention over prior art AG-1 lamps of the same overall exterior dimensions, said dimensions being considered to be the diameter and the overall length from the end of the tip 15 or 11 to the base slot 3 or the outermost ends of the electrical contacts 8. This increased volume at 17 allows greater fillings of combustion-supporting gas and combustible material in a lamp having the same overall size.

Since such lamps of the invention generate greater amounts of light and accompanying heat, it is desirable to design the lamp to absorb more heat to avoid burning of the plastic coating 18 or breakage of the glass portion of the wall 19. As illustrated, the glass wall 19 of lamps of the invention can preferably be of a greater thickness than the glass walls 20 of prior art AG–1 photoflash lamps. Also, heavier coatings of plastic 18 can be used on lamps of the invention than on prior art lamps if desirable. The plastic coating will often somewhat bridge over the well-shaped portion 14 as shown at 21. Extra build-ups of plastic in this region during ordinary plastic coating further aid in protecting the tip.

As described in copending application Serial No. 467,886, lamps of the invention can be manufactured in essentially the same way as standard AG–1 lamps (see Patent 3,188,162) with the additional step of moving the tubular bulb portion of the lamp and the attenuation toward each other while the dome of the bulb is hot and in a plastic condition and after the attenuation has cooled and hardened to be stiff enough to be able to deform the hot dome.

In particular embodiments of the invention, the filamentary combustible material may be zirconium in an amount of at least approximately 15 mg. per cc. of bulb volume, in combination with an oxygenous combustion-supporting atmosphere such as oxygen at a pressure of at least several atmospheres. Such a lamp will have a total light output per unit bulb volume of at least 3000 lumen seconds per cc. and generally considerably more than that. More particularly, clear flash lamps of the invention may have an oxygen fill pressure of at least approximately seven atmospheres, such as 7.5–8 atmospheres, a bulb wall thickness approximately in the range of 0.024–0.037 inch, and shredded zirconium foil filamentary combustible material with the shredded strands having a thickness between about 0.0005 and 0.003 inch and a width of about between 0.0005 and 0.003 inch, with a preferred strand size being about 0.0008 inch thick and about 0.0015 inch wide, in a quantity of about 23–27 mg. per cc. of bulb volume. Such a lamp would give a light output of approximately at least 7400 lumen seconds per cc. with a total light output of about 10,000 lumen seconds.

Various designs of lamps according to the invention were tested having different amounts of zirconium foil and oxygen filling. The following table presents the average light results for the different designs tested. Ten lamps were tested for each lot variation. In the table headings, msec. means milliseconds, 1×10⁶ means million-lumens, and l-sec. means lumen seconds. The zirconium foil was shredded from a roll of foil having a width of about 4 inches. The lamps in Lot VII were the same as those in Lot VI but were photometered in the horizontal position instead of the conventional vertical position.

Each of the lamps for which data are presented in the above table had the same bulb design, with the overall exterior dimensions and the configuration of the bulb, except at the tipped end, being essentially the same as for conventional AG–1 lamps. Clear conventional AG–1 lamps have a light output of approximately 7000 lumen seconds, a light peak of about 400,000 lumens, a time to peak of about 12 milliseconds, and a flash duration at half peak of about 15 milliseconds. The conventional AG–1 has a maximum length from the tip to the bottom of the groove of 1.170 inches and from the tip to the end of the electrical contacts of 1.315 inches, and a maximum diameter of 0.500 inch, according to A.S.A. specifications.

Using glass tubing having a wall thickness of about 0.027 inch, as in standard AG–1 production, flash lamps according to the invention with the same overall exterior dimensions have a volume of about 20–25% greater than standard AG–1 lamps. When a glass tube wall thickness of about 0.035 inch is used in lamps of the invention, the internal volume is still at least as great as in a standard AG–1 which has 0.027 inch thick walls, allowing considerably higher gas pressures and foil fillings by strengthening the bulb. Such flash lamps are preferably made with a foil filling of about 31.5 milligrams zirconium foil with strand thicknesses of about 0.0008 inch and widths of about 0.0015 inch, and an oxygen filling of about 7.5–8 atmospheres, equivalent to 9.4 cc. oxygen at room temperatures and atmospheric pressure. This results in a photoflash lamp having a light output of at least about 10,000 lumen seconds with a peak of about 570,000 lumens and a time to peak intensity of about 12 milliseconds. Standard blue photoflash lamps have light output intensities of about 73% of that for corresponding clear photoflash lamps.

What I claim as new and desire to secure by Letters Patent of the United States is:

1. A photoflash lamp comprising a hermetically sealed tubular bulb containing ignition means, combustible material, and a combustion-supporting atmosphere, said bulb being closed at one end by an exhaust tip, the bulb wall at said one end being re-entrant into the tubular bulb to provide a retroverted well, essentially symmetrical about the axis of the tubular bulb, with the exhaust tip arising outwardly from said well.

2. A generally cylindrical tubular photoflash lamp according to claim 1 in which the well formed at said one end of said bulb is surrounded by a circular rim at the conjuncture of said well with the cylindrical portion of the wall of said bulb, and in which a substantial portion of the exhaust tip of said bulb is depressed within said well below the level of said rim, so that said rim provides at least partial protection to said exhaust tip to minimize the likelihood of mechanical breakage of the exhaust tip.

3. A generally cylindrical tubular photoflash lamp comprising a sealed bulb comprising a short length of glass tubing of substantially uniform wall thickness throughout and having an external stem press portion extending from and closing one end thereof, the other end of said length of glass tubing being re-entrant into the lamp tube to provide a retroverted well essentially symmetrical about the axis of the tubular bulb and surrounded by a raised rim with

LIGHT OUTPUT CHARACTERISTICS OF VARIOUS LAMP DESIGNS

| Lot | Zirconium Foil Thickness (mils) | No. of Cuts of Foil | Avg. Foil Filling Wt. (mg.) | Avg. Oxygen Filling (cc.) | Time to Peak Intensity (msec.) | Peak Intensity (1.×10⁶) | Total Light Output (l-sec.) |
|---|---|---|---|---|---|---|---|
| I | 0.8 | 60 | 23.0 | 6.0 | 16.2 | 0.43 | 6,309 |
| II | 0.8 | 60 | 23.0 | 7.9 | 15.4 | 0.48 | 8,156 |
| III | 0.8 | 60 | 23.0 | 9.8 | 13.7 | 0.52 | 8,180 |
| IV | 0.8 | 84 | 31.6 | 8.1 | 15.0 | 0.44 | 7,192 |
| V | 0.8 | 84 | 31.6 | 9.4 | 15.0 | 0.50 | 8,793 |
| VI | 0.8 | 84 | 31.6 | 10.8 | 14.7 | 0.52 | 9,914 |
| VII | 0.8 | 84 | 31.6 | 10.8 | 14.9 | 0.53 | 10,370 | an exhaust tip arising from the center of said well and closing said other end, said bulb having an internal volume of less than about 2 cc., a protective lacquer coating on the exterior surface of said bulb, a filling of a combustion-supporting gas in said bulb at a pressure of at least several atmospheres, a quantity of combustible filamentary strand material loosely distributed within said bulb and consisting essentially of zirconium, the quantity of said filamentary material in the bulb amounting to approximately at least 15 mg. per cc. of bulb volume, and ignition means in said bulb for igniting said combustible material and comprising a pair of lead-in wires sealed through said stem press, said lamp generating a total light output per unit bulb volume of at least 3000 lumen seconds per cc.

4. A generally cylindrical photoflash lamp comprising a sealed bulb consisting of a short length of drawn glass tubing of substantially uniform wall thickness throughout and having an external stem press portion extending from and closing one end thereof, the other end of said length of glass tubing being re-entrant into the lamp tube to provide a retroverted well essentially symmetrical about the axis of the tubular bulb and surrounded by a raised rim with an exhaust tip arising approximately from the center of said well and closing said other end, said bulb having an internal volume of approximately 1.2–1.35 cc., said glass tubing in the cylindrical portion of said bulb having a thickness approximately in the range of 0.024–0.037 inch, a protective lacquer coating on the exterior surface of said bulb, a filling of oxygen in said bulb at a pressure of at least approximately seven atmospheres, a quantity of combustible filamentary material in said bulb consisting of fine cut strands of zirconium foil loosely distributed within said bulb, said strands having a thicknes of about between 0.0005 and 0.003 inch and a width of about between 0.0005 and 0.003 inch, the quantity of combustible material in said bulb amounting to about 23–27 mg. per cc. of bulb volume, and ignition means in said bulb for igniting said combustible material and comprising a pair of lead-in wires sealed through said stem press, said lamp generating a total light output per unit bulb volume of at least approximately 7400 lumen seconds per cc.

References Cited by the Examiner
UNITED STATES PATENTS

| | | | |
|---|---|---|---|
| 2,913,892 | 11/1959 | Fritz et al. | 67—31 |
| 3,000,200 | 9/1961 | Albrecht | 67—31 |
| 3,263,457 | 8/1966 | Reiber | 67—31 |

References Cited by the Applicant
UNITED STATES PATENTS

| | | |
|---|---|---|
| 786,231 | 3/1905 | McDonnell. |

JAMES W. WESTHAVER, *Primary Examiner.*